(12) United States Patent
Miller et al.

(10) Patent No.: US 12,039,312 B2
(45) Date of Patent: Jul. 16, 2024

(54) DEPLOYMENT OF A MULTI-TECHNOLOGY-STACK APPLICATION

(71) Applicant: Salesforce, Inc., San Francisco, CA (US)

(72) Inventors: Michael Dwayne Miller, San Rafael, CA (US); Leo Duy Tran, Piedmont, CA (US); Marshall Ludwig Hall, Santa Rosa, CA (US); Natasha Sushil Gupta, Broomfield, CO (US)

(73) Assignee: Salesforce, Inc., San Francisco, CA (US)

( * ) Notice: Subject to any disclaimer, the term of this patent is extended or adjusted under 35 U.S.C. 154(b) by 70 days.

(21) Appl. No.: 18/063,664

(22) Filed: Dec. 8, 2022

(65) Prior Publication Data
US 2024/0095003 A1 Mar. 21, 2024

Related U.S. Application Data

(60) Provisional application No. 63/376,268, filed on Sep. 19, 2022.

(51) Int. Cl.
*G06F 9/445* (2018.01)
*G06F 8/61* (2018.01)

(52) U.S. Cl.
CPC ..................... *G06F 8/61* (2013.01)

(58) Field of Classification Search
CPC ........................................ G06F 8/61
USPC ........................................ 717/175
See application file for complete search history.

(56) References Cited

U.S. PATENT DOCUMENTS

| 7,069,560 | B1 * | 6/2006 | Cheyer ............... G06F 16/3334 |
| | | | 709/202 |
| 9,774,688 | B2 | 9/2017 | Tran et al. |
| 10,459,718 | B2 | 10/2019 | Miller et al. |
| 10,496,526 | B2 | 12/2019 | Wunderlich et al. |

(Continued)

OTHER PUBLICATIONS

De Haan, P., "Create a Terraform plugin for managing Tableau content as code," Tableau Software, LLC, downloaded from https://community.tableau.com/s/idea/0874T000000HDkFQAW/detail, retrieved on Dec. 28, 2022, 5 pages.

(Continued)

*Primary Examiner* — Evral E Bodden
(74) *Attorney, Agent, or Firm* — NICHOLSON DE VOS WEBSTER & ELLIOTT LLP

(57) ABSTRACT

Implementations(s) for deploying application(s) are described. Responsive to an indication to install a specific instance of an application registered in a registry, first and second code are retrieved from the registry to cause the installation. Responsive to the first and second code, it is detected that the first code is executable to receive information that will be generated responsive to execution of the second code; the specific instance of the second part of the application is caused to be deployed on the second technology stack (TS) using the fourth code identified in the second code; the information is received; and a specific instance of the first part of the application is caused to be deployed on the first TS using the third code identified in the first code and to be configured to communicate with the specific instance of the second part of the application using the information.

24 Claims, 8 Drawing Sheets

(56) References Cited

U.S. PATENT DOCUMENTS

| | | | |
|---|---|---|---|
| 10,548,185 B2* | 1/2020 | Mustafic | H04W 8/183 |
| 10,936,582 B2 | 3/2021 | Tran et al. | |
| 10,956,305 B2 | 3/2021 | Wunderlich et al. | |
| 11,102,214 B2* | 8/2021 | Kukreja | G06F 9/468 |
| 11,360,765 B2 | 6/2022 | Miller et al. | |
| 11,366,804 B2 | 6/2022 | Tran et al. | |
| 11,366,805 B2 | 6/2022 | Tran et al. | |
| 11,836,150 B2 | 12/2023 | Tran et al. | |
| 2016/0162128 A1 | 6/2016 | Hansen et al. | |
| 2020/0097476 A1 | 3/2020 | Tran et al. | |
| 2020/0272456 A1 | 8/2020 | Miller et al. | |
| 2022/0114238 A1 | 4/2022 | Padmanabhan et al. | |

OTHER PUBLICATIONS

De Vries, A., "Embedding with Tableau Online: An Overview," The Information Lab, May 24, 2021, 12 pages.

Gulati, et al., "Tableau development environment setup alternatives with and without Data Migration from Development to Production," Webner, https://blog.webnersolutions.com/tableau-development-environment-setup-alternatives/, Jul. 3, 2019, 3 pages.

Pulumi, "Pulumi vs. Terraform," downloaded from https://web.archive.org/web/20220704204133/https://www.pulumi.com/docs/intro/vs/terraform/ on Jan. 3, 2023, Web Archive capture Jul. 4, 2022, 13 pages.

salesforce.com, Inc., "Salesforce DX Developer Guide," Version 55.0, Summer '22, Last updated: Aug. 5, 2022, pp. 1-439.

salesforce.com, Inc., "Salesforce DX Developer Guide," Version 56.0, Winter '23, Last updated: Nov. 10, 2022, pp. 1-516.

salesforce.com, Inc., "Tooling API, Reference and Developer Guide," Version 55.0, Summer '22, Last updated: Jul. 30, 2022, pp. 1-772.

salesforce.com, Inc., "Using Terraform with Heroku," Last updated Nov. 7, 2022, downloaded from https://devcenter.heroku.com/articles/using-terraform-with-heroku, pp. 1-12.

Tableau Software LLC, "Publishing Resources" Tableau Server REST API, downloaded from http:/web.archive.org/web/20220716010643/https://help.tableau.com/current/api/rest_api/en-us/REST/rest_api_concepts_publish.htm on Jan. 3, 2023, Web Archive capture Jul. 16, 2022, 18 pages.

Tableau Software, LLC, "A Tableau champion's guide to migrating workbooks and data sources," downloaded from https://www.tableau.com/blog/migrating-tableau-workbooks-and-datasources-across-projects-sites-and-servers on Dec. 28, 2022, 11 pages.

* cited by examiner

RESPONSIVE TO RECEIVING AN INDICATION TO REGISTER AN APPLICATION FOR SUBSEQUENT INSTALLATIONS OF THE APPLICATION, RETRIEVE FIRST AND SECOND CODE FROM A REPOSITORY, WHERE THE APPLICATION HAS A FIRST PART AND A SECOND PART TO BE RESPECTIVELY EXECUTED ON A FIRST TECHNOLOGY STACK (TS) AND A SECOND TS BASED RESPECTIVELY ON THIRD AND FOURTH CODE, WHERE A TS IS A STACK OF SOFTWARE USED TO BUILD AND EXECUTE APPLICATIONS, AND WHERE THE FIRST AND SECOND CODE, WHEN EXECUTED BY A SERVICE, CAUSES THE SERVICE TO PERFORM THE FOLLOWING OPERATIONS.
272

↓

DETECT THAT THE FIRST CODE IS EXECUTABLE TO RECEIVE INFORMATION THAT WILL BE GENERATED RESPONSIVE TO EXECUTION OF THE SECOND CODE
274

↓

CAUSE, RESPONSIVE TO EXECUTING THE SECOND CODE, DEPLOYMENT OF THE SPECIFIC INSTANCE OF THE SECOND PART OF THE APPLICATION ON THE SECOND TS USING THE FOURTH CODE IDENTIFIED IN THE SECOND CODE
276

↓

RECEIVE THE INFORMATION, WHERE THE INFORMATION WAS DETERMINED AS PART OF THE DEPLOYMENT AND IS ABOUT HOW TO COMMUNICATE WITH THE SPECIFIC INSTANCE OF THE SECOND PART OF THE APPLICATION
278

↓

CAUSE, RESPONSIVE TO EXECUTING THE FIRST CODE, A SPECIFIC INSTANCE OF THE FIRST PART OF THE APPLICATION TO BE DEPLOYED ON THE FIRST TS USING THE THIRD CODE IDENTIFIED IN THE FIRST CODE AND CONFIGURED TO COMMUNICATE WITH THE SPECIFIC INSTANCE OF THE SECOND PART OF THE APPLICATION USING THE INFORMATION
280

↓

REGISTERING THE APPLICATION AS RETRIEVABLE FOR THE SUBSEQUENT INSTALLATIONS OF THE APPLICATION
282

FIG. 3B

DEPLOYMENT OF A MULTI-TECHNOLOGY-STACK APPLICATION

CROSS-REFERENCE TO RELATED APPLICATIONS

This application claims the benefit of U.S. Provisional Application No. 63/376,268, filed Sep. 19, 2022, which is hereby incorporated by reference.

TECHNICAL FIELD

One or more implementations relate to the field of deployment of software; and more specifically, to the deployment of an application that executes on multiple technology stacks (e.g., multiple cloud-based platforms).

BACKGROUND ART

An application (sometimes referred to as an app) may be developed and deployed using a technology stack (sometimes referred to as a tech stack). A technology stack may be a stack of software, e.g., one that is provided on a cloud-based software development and deployment platform (e.g., a platform-as-a-service (PaaS)). Also, an application may be developed and subsequently deployed in a manner that different instances of the application are deployed for different organizations (by way of example and not limitation, in a multi-tenant architecture, for different tenants on the platform). The deployment may be via a marketplace (sometimes referred to as an app store). In such situations, there is a provider of the platform, a customer of the platform that is an application developer, and a customer of the application developer. The customer of the application developer choses the application from the marketplace, and a specific instance is deployed for that customer.

In some implementations, an application may be developed in a manner that requires different parts of a single instance of the application be deployed on different technology stacks, and these different parts interact to perform at least some of the operations supported by the application. Such applications are sometimes referred to as multi-technology stack applications, multi-cloud applications, or cross-cloud applications, while the software development and deployment platform for such applications is referred to as a multi-technology stack or multiple cloud-based software development and deployment platform or environment.

The different technology stacks can exist for a variety of reasons. For example, assume that initially a first and second company are respectively providing a first and second service respectively using a first and second technology stack, and an application developer wishes to develop an application with a first and second part that respectively use the first and second services. Additionally, while the first and second companies start off as separate companies, they may become the same company via a merger or acquisition. In such a situation, the first and second services are now being provided by the same company, but the services are still being respectively provided using the first and second technology stacks.

BRIEF DESCRIPTION OF THE DRAWINGS

The following figures use like reference numbers to refer to like elements. Although the following figures depict various example implementations, alternative implementations are within the spirit and scope of the appended claims. In the drawings:

FIG. 3B is a flow diagram illustrating another aspect of the installation of an example MTS application according to some example implementations.

DETAILED DESCRIPTION

Figure 1A:
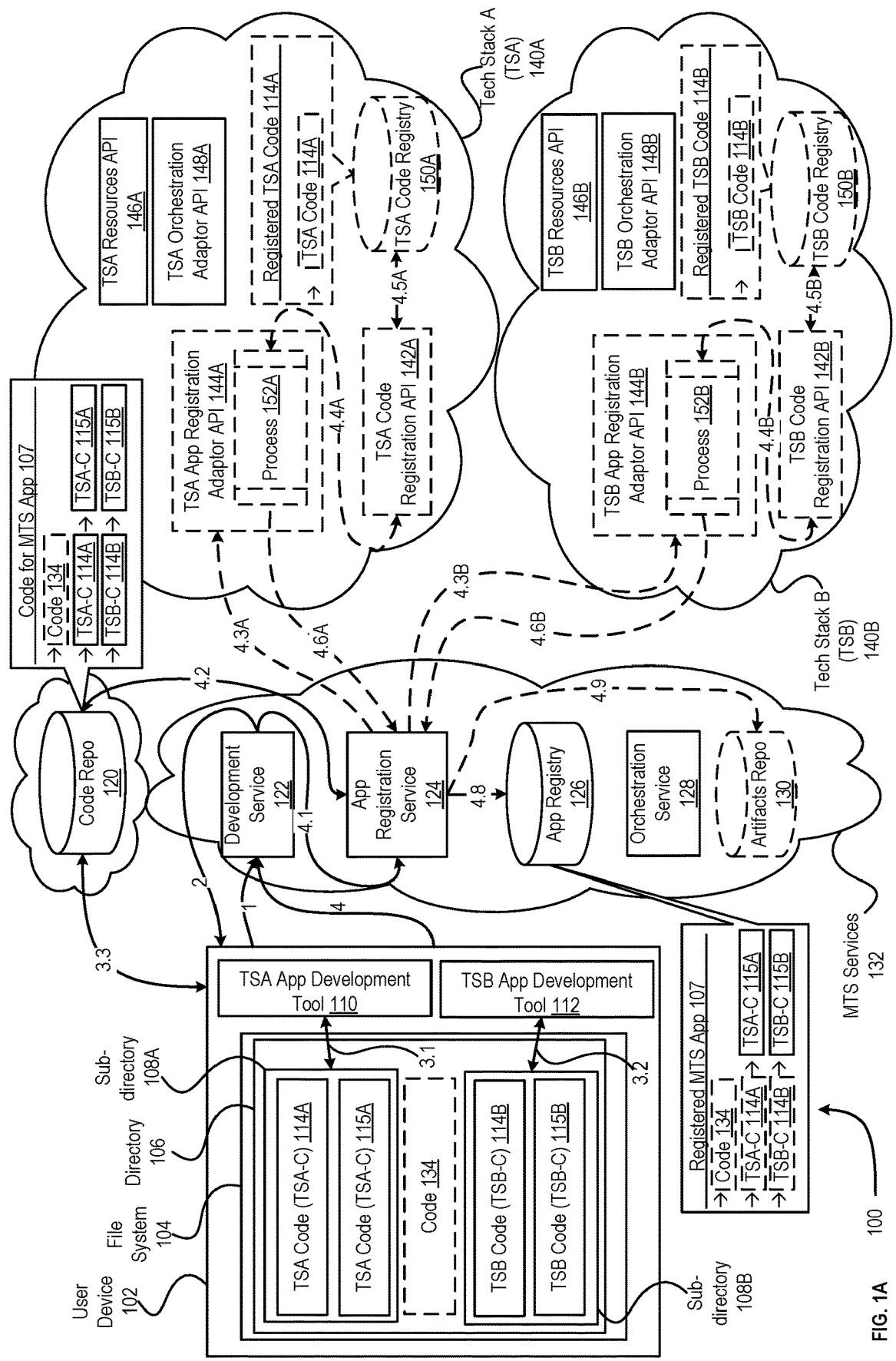
FIG. 1A is a diagram illustrating one aspect of the installation of an example multi-technology stack (MTS) application according to some example implementations.

The following description describes implementations for deployment of applications that require different parts of a single instance of the application be deployed on different technology stacks, and these different parts interact to perform at least some of the operations supported by the application. One issue with deploying such applications is the need to enable the interactions between the different parts of the applications executing on the different technology stacks. In particular, manual step(s) are typically performed (e.g., by a user, such as an application developer) after the parts for a given instance have been deployed on the technology stacks. In addition, due to the differences in the distinct stacks of software, the manual steps performed may vary for different ones of the technology stacks. Thus, the need to enable the interactions between the different parts on the different technology stacks require different manual steps be performed responsive to a customer choosing the application in a marketplace Some implementations described herein overcome this disadvantage by obviating the need for these manual steps (e.g., by using computer-executable deployment instructions (also referred to as deployment code)). As a result, these implementations improve the operation of the electronic devices (e.g., computers) involved because these implementations, for example, avoid wasting the extra energy (e.g., CPU cycles) needed for these manual steps and/or to correct errors that result from them.

In addition, such implementations overcome this disadvantage by executing different deployment instructions for the different parts of the application as one consolidated deployment that executes in a single process as opposed to separate processes. As a result, there is no need to allocate and free up a different memory address space for the deployment of each part of the application and thus more efficient use of memory results from such implementations. As a further result, the output from the deployment of a first part of the application ("first deployment") is available directly in the same memory address space to the deployment of a second part of the application ("second deployment"). In contrast to an alternative implementation where the output is stored in a second storage, the implementations described herein avoid the additional amount of CPU processing time required for the first deployment to write the output to a secondary storage and for the second deployment to read the stored output from the second storage. Also, the use of the second storage to store the output is avoided. In contrast to another alternative implementation where the output is communicated from the first deployment to the second deployment via an inter-process mechanism (e.g., API calls), the implementations described herein avoid the additional amount of CPU processing time (and, in some cases, additional network bandwidth usage) to prepare, transmit, receive, and process the output.

FIG. 1A is a diagram illustrating one aspect of the deployment of an example multi-technology stack (MTS) application according to some example implementations. The environment 100 includes a user device 102, code repo 120 (sometimes referred to as projects repo; where repo refers to repository), MTS services 132, tech stack A 140A (sometimes referred to as technology stack A or TSA), tech stack B 140B (sometimes referred to as technology stack B or TSB).

User device 102 may include application development tools for developing applications locally on a file system 104. TSA app development tool 110 and TSB app development tool 112 may be used to develop respectively a first part and a second part of an MTS application (sometime referred to as MTS app), where the first and second part will be executed on tech stack A 140A and tech stack B 140B, respectively. User device 102 may invoke (via TSA app development tool 110 and/or TSB app development tool 112) one or more services in MTS services 132 to perform initial setup for the development of an MTS application and/or to register a developed MTS application for subsequent installations of specific instances of the MTS application, where each such instance includes a first part and a second part respectively installed on tech stack A 140A and tech stack B 140B.

Code repo 120 may be a repository for storing the code from which instances of the MTS applications will be generated/implemented (such code is sometimes referred to as the application code or app code). Code repo 120 may be an internet-based repository with version control, such as GitHub, AWS CodeCommit, Google Cloud Source Repositories, etc. The app code for a given MTS application may be stored in the code repo 120 in one or more of various forms, such as source code, compiled code (e.g., binaries, bytecode, etc.), etc. In some implementations, other code (sometimes referred to as deployment code) for deploying the app code (be it in source code and/or compiled code form) may be stored along with the app code. The term "code" in the context of deployment code can take a variety of forms (e.g., Terraform code, Pulumi code, shell scripts, etc.) and is sometimes referred to as script(s).

The app code for an MTS application may logically comprise different blocks of code that achieve different purposes when executed. The different blocks of code may be referred to as first app code, second app code, and so on. In one example, one such block of code may be the app code for a given part of the MTS application, which may be referred to as the app code for a first part of the MTS application, a first part of the app code for the MTS application, first app code for the MTS application, or, simply, first app code. On the other hand, the phrase "app code for the MTS application" refers to the collection of all the blocks of app code, as described herein.

Similarly, the deployment code for an MTS application may logically comprise different blocks of code that achieve different purposes when executed. The different blocks of code may be referred to as first deployment code, second deployment code, and so on. In one example, one such block of code may be the deployment code for a given part of the MTS application, which may be referred to as the deployment code for a first part of the MTS application, a first part of the deployment code for the MTS application, first deployment code for the MTS application, or, simply, first deployment code. In another example, one such block of code may be the deployment code that references other such blocks of code (e.g., the deployment code for a first part of the MTS application and the deployment code for a second part of the MTS application) and describes relationship(s) between these blocks of code. On the other hand, the phrase "deployment code for the MTS application" refers to the collection of all the blocks of deployment code, as described herein.

MTS services 132 include services that support the installation/deployment (and, in some cases, the development) of MTS applications. The services may be cloud-based software services implemented on a cloud platform (e.g., a platform-as-a-service). In FIG. 1A, the services include a development service 122 (sometimes referred to as a project service), an app registration service 124 (sometimes referred to as a bundling service), an app registry 126 (sometimes referred to as a bundle registry), and an orchestration service 128. In some implementations, the services also include artifacts repo 130. In some implementations, MTS services 132 include an installation service (not shown) that is used to install an MTS application in a marketplace (e.g., by a customer of the application developer after an MTS application is developed and released to the marketplace).

Development service 122 may provide default setup (sometimes referred to as initial setup) for the development of an MTS application, e.g., based on the type of the MTS application. The default setup may include a template directory structure for the application. The template directory may include a subdirectory for each part of the application. Development service 122 may also serve as an interface for the other services in MTS services 132, such as app registration service 124 and orchestration service 128.

App registration service 124 may provide the ability to register an MTS application in app registry 126 as a registered MTS application for subsequent installations, e.g., when provided by code repo 120 with the deployment code and the app code for the MTS application. A registered MTS application may sometimes be referred to as a bundle.

Registering the MTS application may include storing the provided deployment code (e.g., in app registry 126). In some implementations, registering the MTS application includes also storing a part of or all of the provided app code of the MTS application. In some implementations, the provided deployment code and/or provided app code are/is stored in artifacts repo 130, e.g., when the storage required exceeds a threshold, when the provided deployment code/app code are in a given file format (e.g., a binary file), and/or when registering each MTS application (e.g., in an implementation where app registry 126 is used for recordkeeping only and not for data storage). In some implementations, artifacts repo 130 also provides version control for the stored app code and/or stored deployment code of the registered MTS application.

A data record representing the registered MTS application may be created (e.g., in app registry 126) and may identify the stored deployment code and, in some implementations, the stored app code. The data record may include identification information of the record (e.g., a unique identifier, which may sometimes be referred to as a bundle Id), which may be used for retrieval of the record and the stored deployment code and, in some implementations, the stored app code at a later time, e.g., upon request. In some implementations, app registry 126 also provides version control for the stored app code and stored deployment code of the registered MTS application.

In some implementations, a part of or all of the provided deployment code may be updated or replaced prior to being stored (e.g., in app registry 126). Each update or replacement operation may include invoking, with a request, the related service or API that is provided by the respective tech stack for the respective part of the MTS application, as described herein.

The registering operation described herein may sometimes be referred to as bundling or bundle creation, and the deployment code and/or the app code associated with a data record representing a registered MTS application may sometimes be referred to as a bundle.

Orchestration service 128 may orchestrate installation(s) of one or more specific instances of an MTS application, e.g., based on a registered MTS application retrieved from app registry 126. The orchestration service 128 analyze the deployment code associated with the registered MTS application to determine whether interaction(s) exist between the different parts of a specific instance of the MTS application. Based on that determination, the orchestration service 128 may execute the deployment code to deploy the parts to the respective tech stacks and to establish the capability of such interaction(s) during the deployment. The execution of the deployment code may include invoking deployment-related service(s) and/or API(s) provided by the respective tech stacks, as described in FIG. 1B.

Tech stack A 140A and tech stack B 140B are example tech stacks. They may be cloud-based platforms, such as a PaaS platform, a software-as-a-service (SaaS) platform, etc. Tech stack A 140A and tech stack B 140B may be implemented using stacks of software, such as backend datastore-related software, frontend presentation-related software, etc. The stacks of software on tech stack A 140A and tech stack B 140B may be, and typically are, different.

Tech stack A 140A may be implemented a number of alternative ways. In some implementations, tech stack A 140A implements TSA code registry 150A (which may sometimes be referred to as package repo) and TSA code registration API 142A (which may sometimes be referred to as packaging API). The combination of these provides the ability to register and store the app code of an application that executes on a single technology stack ("single-technology-stack application"). The registered and stored app code of the single-technology-stack application may be retrievable for deployment on TSA 140A. The ability to register and store the app code of such a single-technology-stack application may be referred to as an ability to support packaging or package creation.

In other implementations, tech stack A 140A implements TSA app registration adaptor API 144A (which may sometimes be referred to as bundling adaptor or bundling adaptor API) in addition to TSA code registry 150A and TSA code registration API 142A. The combination of these provides the additional ability to register and store the app code of a TSA part of an MTS application, which, when registered and stored, may be retrievable for deployment. The ability to register and store the app code of a TSA part of an MTS application may sometimes be referred as an ability to support bundling or bundle creation.

In yet other implementations, tech stack A 140A implements neither TSA code registry 150A, TSA code registration API 142A, nor TSA app registration adaptor API 144A. In such implementations, tech stack A 140A provides neither the ability to register and store the app code of a TSA part of an MTS application nor the ability to register and store the app code of such a single-technology-stack application. Thus, tech stack A 140A in such implementations supports neither packaging nor bundling.

TSA code registry 150A, when implemented, provides the ability to register the app code of a TSA part of an MTS application for subsequent deployment of the TSA part of the MTS application on TSA 140A, e.g., when provided with a copy of the app code of the TSA part of the MTS application. In some implementations, the provided copy of the app code of the TSA part of the MTS application is within a directory structure. Registering the app code of the TSA part of the MTS application may include storing the copy of the app code of the TSA part of the MTS application in TSA code registry 150A. A data record representing the registered app code of the TSA part of the MTS application may be created in TSA code registry 150A (the registered app code of a TSA part of an MTS application may be referred to as a TSA package). The data record may identify the stored copy of the app code of the TSA part of the MTS application. The data record may also include identification information of the record (e.g., a unique identifier for the record, which may sometimes be referred to as a package Id), which may be used for retrieval of the record and the stored copy of the app code of the TSA part at a later time, e.g., upon request. TSA code registry 150A, when implemented, may also provide version control for the stored copy(s) of the app code and stored copy(s) of the deployment code of the TSA part of the MTS application.

TSA code registration API 142A, when implemented, provides API access to the ability of TSA code registry 150A to register the app code of a TSA part of an MTS application.

TSA app registration adaptor API 144A, when implemented, provides the ability to function in concert with app registration service 124 to register an MTS application, e.g., when provided, by app registration service 124, a copy of the app code of and a copy of the deployment code for a TSA part of the MTS application. In some implementations, the provided copy of the app code of and the copy of the deployment code for the TSA part of the MTS application are part of a directory structure. TSA app registration adaptor API 144A may provide the ability to invoke TSA code registration API 142A to register the app code of the TSA part based on the provided copy of the app code of the TSA part. In response to the TSA part being registered in TSA code registry 150A, TSA app registration adaptor API 144A may provide the ability to update the copy of the deployment code for the TSA part based on the registered code of the TSA part so that the copy of the deployment code for the TSA part identifies the stored copy of the app code of the TSA part in TSA code registry 150A (e.g., the location of the stored copy in TSA code registry 150A). In response to the updated copy of the deployment code for the TSA part, TSA app registration adaptor API 144A may provide the ability to send the updated copy to app registration service 124 for registering the MTS application in app registry 126.

TSA app registration adaptor API 144A, when implemented, is described herein as part of TSA 140A by way of example and not limitation. In such implementations, TSA 140A has the responsibility of updating a copy of the deployment code for a TSA part of an MTS application. Such implementations have the advantage of a distributed implementation of the updating operation, i.e., reduced implementation complexities of app registration service 124. In other implementations, TSA app registration adaptor API 144A is implemented as a service in MTS services 132 or as part of app registration service 124. Such implementations have the advantage of a centralized implementation of the updating operation, i.e., no dependency on a tech stack to implement the updating operation.

Similarly, in some implementations, tech stack B 140B implements TSB code registration API 142B and TSB code registry 150B, where the combination of these provides the ability to register and store the app code of a single-technology-stack application (thus support packaging). In other implementations, tech stack B 140B additionally implements TSB app registration adaptor API 144B, where the combination of it with TSB code registry 150B and TSB code registration API 142B provides the additional ability to register and store the app code of a TSB part of an MTS application (thus supporting bundling). In yet other implementations, tech stack B implements neither TSB code registry 150B, TSB code registration API 142B, nor TSB app registration adaptor API 144B (thus supporting neither packaging nor bundling).

TSB app registration adaptor API 144B, TSB code registration API 142B, or TSB code registry 150B, when implemented, may provide ability(s) similar to those provided by TSA app registration adaptor API 144A, TSA code registration API 142A, or TSA code registry 150A, respectively.

Tech stack A 140A may implement TSA resources API 146A to provide API (e.g., one or more API method(s)) for deploying resources (e.g., source code, compiled code, metadata, etc.) to an execution environment (also referred to as a runtime environment) 141A (shown in FIG. 1B) for executing the resources.

Tech stack A 140A may also implement TSA orchestration adaptor API 148A to allow an application developer to generate API calls to TSA resources API 146A (e.g., without explicitly programming the logic to make the calls). For example, TSA orchestration adaptor API 148A may be implemented using an infrastructure as code platform (e.g., Terraform, Pulumi, etc.) and may require an application developer to only declare the resources to deploy in deployment code/instructions for the TSA part of an MTS application. Such a platform supports an intermediate layer (also referred to as a translation layer) between an API and an application, where the layer translates the declared resources into API calls. Such an intermediate layer may be referred to as a provider for a given API. Accordingly, TSA orchestration adaptor API 148A provides the ability to translate resources declared in the deployment code to API calls to TSA resources API 146A.

Similarly, tech stack B 140B may implement TSB resources API 146B to provide an API for deploying resources to an execution environment 141B (shown in FIG. 1B) for executing the resources. Tech stack B 140B may also implement TSB orchestration adaptor API 148B, where 148B provides the ability to translate declared resources to API calls to TSB resources API 146B. Moreover, TSB resources API 146B or TSB orchestration adaptor API 148B, when implemented, provides ability(s) similar to those provided by TSA resources API 146A or TSA orchestration adaptor API 148A, respectively.

A user (e.g., an application developer) may cause the performance of one or more operations to develop an MTS application using user device 202. For example, at operation 1, a user (e.g., an application developer) causes user device 102 to invoke (via TSA app development tool 110 and/or TSB app development tool 112) development service 122 to perform initial setup for the development of an MTS application 107. The invocation may indicate MTS application 107 is an application type that is associated tech stack A 140A and tech stack B 140B.

In response, at operation 2, development service 122 returns a template directory structure (e.g., in a zip file) for the indicated MTS application type. The template directory structure may be placed in the directory 106 (e.g., the current working directory) of file system 104. As a result, a subdirectory 108A and a subdirectory 108B from the template directory, which are respectively for the TSA part and TSB part of the MTS application 107, are created under directory 106. The subdirectories may include their respective template code for implementing/generating the respective part of MTS application 107 (sometimes referred to as template app code for the respective part) (not shown) and, in some implementations, template code for deploying app code for the respective part (sometimes referred to as template deployment code) (not shown).

At operations 3.1 and 3.2, the application developer develops the MTS application 107 using the TSA app development tool 110 and TSB app development tool 112, respectively, which may read and write the app code and deployment code for the respective part of the MTS application 107 in the respective subdirectories 108A and 108B. The application developer may continue to develop the application for a period of time and the content of the directory structure (as shown) may result from the development process.

Subdirectory 108A may include TSA code 114A (sometimes also referred to as TSA app code 114A), which is the code for generating/implementing the TSA part of MTS application 107. TSA app code 114A may be in a variety of forms, such as source code (which may include code and/or data that configures the source code (sometimes also referred to as metadata), compiled code, etc.

Subdirectory 108A may also include TSA code 115A (sometimes also referred to as TSA deployment code 115A), which is the code for deploying TSA app code 114A. TSA deployment code 115A may be in the form of declared resources, each of which may represent a file including source code or compiled code, a file directory including file(s) of source code/compiled code, etc. TSA deployment code 115A identifies TSA app code 114A (e.g., the location of TSA app code 114A, be it a local or remote location) and, when executed, is used to cause the deployment of TSA app code 114A on TSA 140A.

Subdirectory 108B may include TSB code 114B (sometimes also referred to as TSB app code 114B) and TSB code 115B (sometimes also referred to as TSB deployment code 115B) for the TSB part of MTS application 107 similar to TSA app code 114A and TSA deployment code 115A, respectively.

TSA deployment code 115A may specify dependency(s) on TSB deployment code 115B, or vice versa. For example, TSA deployment code 115A specifies that it expects an output from the execution of TSB deployment code 115B (e.g., to enable interaction(s) between the TSA part and TSB part of MTS application 107). Such expectation may be expressed as a variable declared in TSA deployment code 115A ("input TSA variable") being assigned the value of a variable declared in TSB deployment code 115B ("output TSB variable"). The output TSB variable may be configurable to hold an output from an API call (e.g., to TSA orchestration adaptor API 148A, which subsequently calls TSA resources API 146A). The output may hold information about how to communicate with the deployed TSB app code 114B, such as the value of a location identifier of the deployed TSB app code 114B, where the location identifier is unknown until TSB app code 114B is deployed on TSB 140B. Examples of such a location identifier are the URL of a web application, the URL of a representational state transfer (REST) API, etc. In an example implementation where TSA deployment code 115A and TSB deployment code 115B are implemented using an infrastructure as code platform (e.g., Terraform, Pulumi, etc.), the output TSB variable may be an output variable of a first modular component (e.g., module, package, function, etc.) associated with TSB deployment code 115B and the input TSA variable may be an input variable of a second modular component associated with TSA deployment code 115A.

In some implementations, directory 106 also includes code 134 (sometimes referred to as deployment code 134). Deployment code 134 may include code that identifies TSA deployment code 115A and TSB deployment code 115B and may also specify dependency (s) between TSA deployment code 115A and TSB deployment code 115B. Similar to the example described herein of how TSA deployment code 115A specifies a dependency on TSB deployment code 115B, deployment code 134 may specify that TSA deployment code 115A expects an output from the execution of TSB deployment code 115B (e.g., to enable interaction(s) between the TSA part and TSB apart of MTS application 107). In an example implementation where deployment code 134, TSA deployment code 115A, TSB deployment code 115B are implemented using an infrastructure as code platform, the TSA deployment code's 115A expectation of an output from TSB deployment code 115B may similarly be expressed as an input variable (i.e., input TSA variable) of a first modular component associated with TSA deployment code 115A being assigned the value of an output variable (i.e., output TSB variable) of a second modular component associated with TSB deployment code 115B.

During the development of an MTS application, the application developer may cause the app code of the MTS application to be stored in code repo 120. For example, during the development of MTS application 107, during the performance of or in response to operations 3.1/3.2, at operation 3.3, the application developer initiates (via TSA app development tool 110 and/or TSB app development tool 112) storing (sometimes referred as committing) of the app code and deployment code for MTS application 107 described herein in code repo 120. In some implementations, the storing operation is automated without requiring any action from the application developer, e.g., after the automation is configured. A storing operation causes the copies of the latest app code and deployment code for MTS application 107 in file system 104 to be stored with an association with an identifier (sometimes referred to as a project) identifying MTS application 107 in code repo 120. For example, as shown, copies of TSA app code 114A, TSA deployment code 115A, TSB app code 114B, TSB deployment code 115B, and, in some implementations, deployment code 134 (sometimes collectively referred to as code for MTS Application 107) may be stored in code repo 120. Once stored, information about how to access code for MTS application 107 (such information is sometimes referred to as code repo access information, such as a repo URL) is available and may be returned to user device 102.

In some implementations, each storing operation causes a newer version of the respective app code and/or deployment code for MTS application 107 to be stored while the older version(s) are still stored and tracked, e.g., when a change is detected by code repo 120. In some implementations, the app code and deployment code on file system 104 are stored in code repo 120 as part of directory structure of 106, 108A and 108B. In some implementations, a compiled version of TSA app code 114A and TSB app code 114B are additionally or alternatively stored in code repo 120, e.g., in the case that TSA app code 114A and TSB app code 114B are in source code format.

Development service 122 may serve as an interface for app registration service 124 to receive a request for registering an MTS application for subsequent installations of the application. For example, at operation 4, user device 102 invokes (via TSA app development tool 110 and/or TSB app development tool 112) development service 122, with a request, to register MTS application 107 for subsequent installations (sometimes referred as deployment) of MTS application 107. The request includes code repo access information for MTS application 107.

App registration service 124 may receive a request for registering an MTS application for subsequent installations of the application (e.g., from development service 122). For example, in response to operations 3.1, 3.2, and 3.3, at operation 4.1, the request may be forwarded to app registration service 124.

Responsive to a request for registering an MTS application for subsequent installations of the application, app registration service 124 may retrieve app code and deployment code from code repo 120. For example, in response to operation 4.1, at operation 4.2, in response to the request, app registration service 124 retrieves code for MTS application 107 (as shown) from code repo 120. In the case that the code for MTS application 107 is stored as part of its directory structure as described herein in code repo 120, the code for MTS application 107 is retrieved as part of its directory structure.

When executed by a service, the app code and deployment code retrieved form the code repo 120 may cause the service to perform one or more operations. For example, as described in FIG. 1B, orchestration service 128 may perform one or more operations to install a specific instance of the MTS application as requested. See FIG. 1B for more details about the operation(s).

Responsive to the retrieved app code and deployment code, app registration service 124 may register the MTS application as retrievable for the subsequent installations of the application. For example, in response to operation 4.2, at operation 4.8, in response to the retrieved code for MTS application 107, app registration service 124 registers MTS application 107 in app registry 126 as a registered MTS application 107 for subsequent installations. Registering MTS application 107 may include storing retrieved code for MTS application 107 in app registry 126. As described herein, a data record representing the registered MTS application 107 may also be created to identify the stored code for MTS application 107.

In some implementations, prior to registering the MTS application, app registration service 124 may determine whether the respective tech stack of each part of the MTS application supports bundling. For example, in some implementations, prior to registering MTS application 107, the app registration service 124 determines whether TSA 140A supports bundling. Such determination may be based on a query against a tech stack information registry (not shown; also referred to as cloud information registry). In some implementations, a tech stack information registry may be part of MTS services 132 and store information about whether each tech stack has the ability to support bundling, e.g., based on the same information previously provided by each tech stack. In some alternative implementations, there is a tech stack information registry within each tech stack that store information about whether the respective tech stack has the ability to support bundling.

Responsive to determining that a given tech stack supports bundling, app registration service 124 may cause the app code of the respective part of the MTS application to be registered by the given tech stack. For example, in the case that the app registration service 124 determines that TSA 104A supports bundling, at operation 4.3A, the app registration service 124 invokes, with a request ("app registration request"), TSA app registration adaptor API 144A to register TSA app code 114A. The app registration request may include a copy of TSA app code 114A and a copy of TSA deployment code 115A, a reference that may be used to locate a version to make a copy from, etc. In response, process 152A within the implementation of TSA app registration adaptor API 144A, at operation 4.4A (in the outbound direction), invokes TSA code registration API 142A to register a copy of TSA app code 114A. In response, at operation 4.5A (in the outbound direction), TSA code registration API 142A registers TSA app code 114A, which includes storing the copy of TSA app code 114A in the TSA code registry 150A and creating a data record representing TSA app code 114A (shown as "registered TSA code 114A" and sometime referred to as registered TSA app code 114A), as described herein. In response, at operation 4.5A (in the outbound direction), TSA code registry 150A sends a response to TSA app registration adaptor API 144A, where the response may indicate the completion of the registration and may include a unique identifier of the record of registered TSA app code 114A (e.g., for later retrieval of the record). In response, at operation 4.4A (in the outbound direction), TSA code registration API 142A forwards the response to TSA app registration adaptor API 144A. In response, process 152A performs one or more operations to update the copy of TSA deployment code 115A to identify the copy of TSA app code 114A that has been stored in TSA code registry 150A (e.g., using the unique identifier of the record).

App registration service 124 may receive, from the given tech stack, a modified version of the respective part of the deployment code associated with the respective part of the MTS application (e.g., responsive to the respective part of the MTS application be registered). For example, in response to the update operation performed by process 152A, at operation 4.6A, process 152A sends the updated copy of TSA deployment code 115A to the app registration service 124 for registering the MTS application 107 in app registry 126.

App registration service 124 may replace the respective part of the deployment code with the modified version from the given tech stack (e.g., responsive to receiving, from the given tech stack, the modified version of the respective part of the deployment code). For example, in response to operation 4.6A, app registration service 124 uses the updated copy of TSA deployment code 115A to replace the copy of TSA deployment code 115A that was retrieved from code repo 120. At operation 4.8, app registration service 124 performs the replacement and does not store the copy of TSA app code 114A when registering MTS application 107 in app registry 126.

In the implementations where app registration service 124 retrieves the copy of TSA app code 114A and the copy of TSA deployment code 115A as part of their directory structure (i.e., subdirectory 108A), the operations described herein may be modified as follows. For example, at operation 4.3A, the app registration request includes subdirectory 108A and the content of the subdirectory. In response to receiving the response from TSA code registry 150A, the process 152A of TSA app registration adaptor API 144A updates the copy of TSA deployment code 115A (as described herein) within subdirectory 108A and remove TSA app code 114A from subdirectory 108A. At operation 4.6A, the process 152A of TSA app registration adaptor API 144A sends the updated subdirectory 108A to the app registration service 124. In response, the app registration service 124 uses the updated subdirectory 108A to replace the subdirectory 108A retrieved from code repo 120. At operation 4.8, the app registration service 124 stores the updated subdirectory 108A in app registry 126 when registering MTS application 107.

Responsive to determining that a given tech stack does not support bundling, app registration service 124 may register the app code of the respective part of the MTS application as part of the registering of the MTS application. For example, app registration service 124 determines that TSA 104A does not support bundling, none of operations 4.3A, 4.4A, 4.4A, 4.5A, and 4.6A is performed. In such a case, at operation 4.8, app registration service 124 stores the copy of TSA app code 114A and the copy of TSA deployment code 115A as retrieved from code repo 120 in app registry 126 as part of registering MTS application 107. In the case the copies were retrieved as part of subdirectory 108A, app registration service 124 stores subdirectory 108A as retrieved in app registry 126 when registering MTS application 107. In some implementations, the copy of TSA app code 114A is stored in artifacts repo 130 at operation 4.9, as part of subdirectory 108A if the copy of 114A was retrieved as part of subdirectory 108A, when registering MTS application 107.

In some implementations, operations 4.3A through 4.6A are performed in all cases (e.g., TSA's 140A support for bundling is assumed). Such implementations may arise from a situation where the foreknowledge of TSA's 140A support for bundling is available before/when app registration service 124 is implemented.

In some implementations, operations 4.3A through 4.6A are performed in none of the cases (e.g., TSA's 140A lack of support for bundling is assumed). Such implementations may arise from a situation where the foreknowledge of TSA's 140A lack of support for bundling is available before/when app registration service 124 is implemented.

In some implementations, prior to registering MTS application 107, app registration service 124 may determine whether TSB 140B supports bundling. Such determination may be implemented similarly to the determination of whether TSA 140A supports bundling.

In the case that app registration service 124 determines that TSB 104B supports bundling, operations 4.3B, 4.4B, 4.5B, and 4.6B are performed similarly to operations 4.3A, 4.4A, 4.5A, and 4.6A, respectively. Accordingly, TSB app code 114B is registered in TSB code registry 150B; an updated copy of TSB deployment code 115B is generated by TSB app registration adaptor API 144B; the original copy of TSB deployment code 115B retrieved from code repo 120 is replaced by the updated copy of TSB deployment code 115B; the copy of TSB app code 114B retrieved from the code repo 120 is discarded; and the updated copy of TSB deployment code 115B is stored in app registry 126, as part of subdirectory 108B if the original copy of 115B was retrieved as part of the subdirectory, when registering MTS application 107.

Alternatively, in the case that app registration service 124 determines that TSB 140B does not support bundling, none of operations 4.3B, 4.4B, 4.5B, or 4.6B is performed. In such a case, at operation 4.8, app registration service 124 stores the copy of TSB app code 114B and the copy of TSB deployment code 115B in app registry 126 when registering MTS application 107. In the case the copies were retrieved as part of subdirectory 108B, app registration service 124 may store the subdirectory in app registry 126 when registering MTS application 107. In some implementations, the copy of TSB app code 114B is stored in artifacts repo 130, as part of subdirectory 108B if the copy of 114B was retrieved as part of the subdirectory.

Figure 1B:
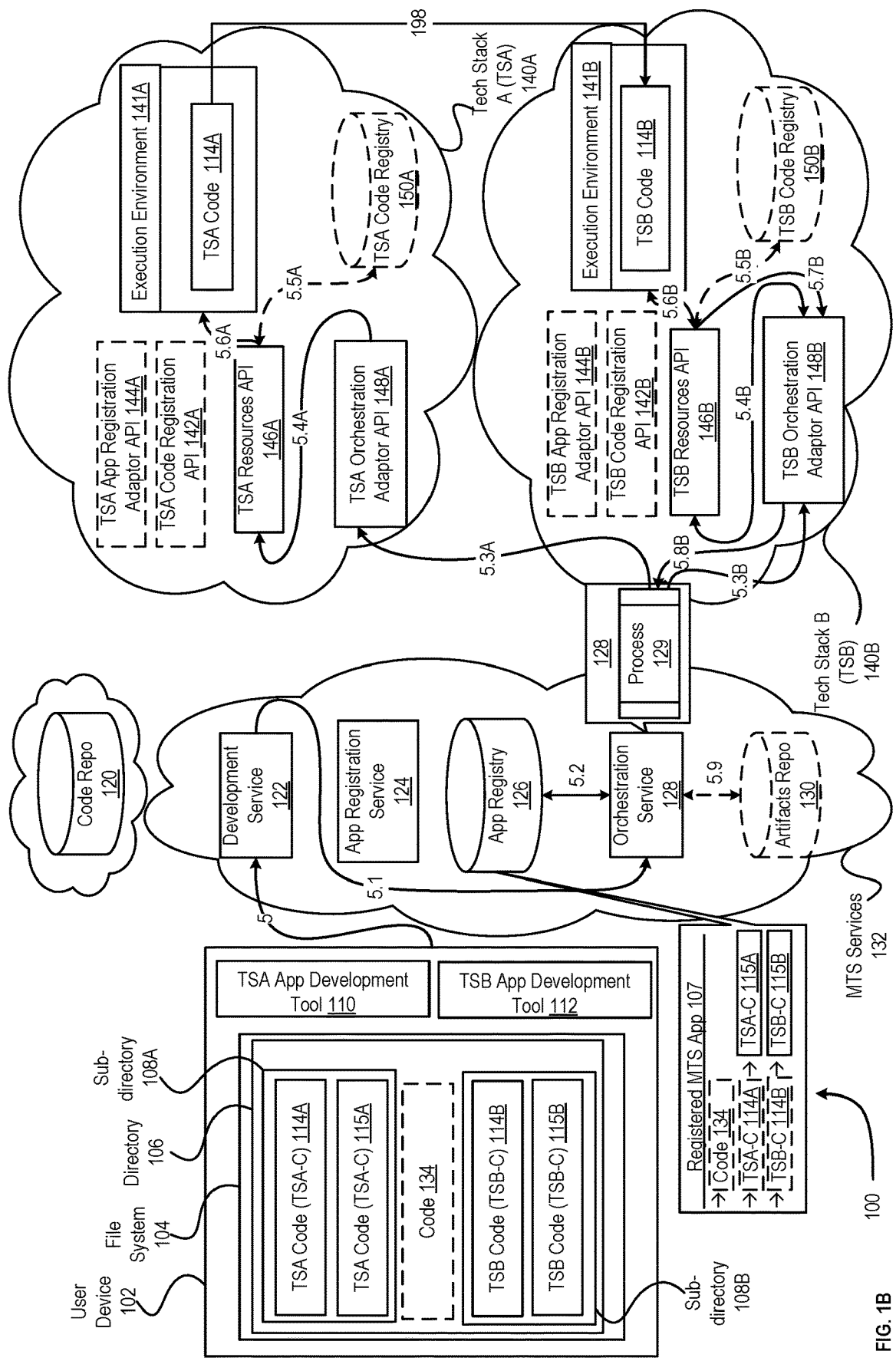
FIG. 1B is a diagram illustrating another aspect of the installation of an example MTS application according to some example implementations.

FIG. 1B is a diagram illustrating another aspect of the deployment of an example MTS application according to some example implementations in environment 100 (as described in FIG. 1A).

Development service 122 may serve as an interface for orchestration service 128 to receive a request for installing a specific instance of an MTS application registered in a registry. For example, in response to operations 4.8 and/or 4.9 (as shown in FIG. 1A), at operation 5, user device 102 invokes (via TSA app development tool 110 and/or TSB app development tool 112) development service 122, with a request, to install a specific instance of registered MTS application 107. The request may include identification information of registered MTS application 107.

Orchestration service 128 may receive a request for installing a specific instance of an MTS application registered in a registry (e.g., from development service 122). For example, in response to operation 5, at operation 5.1, development service 122 forwards the request to orchestration service 128.

Responsive to a request for installing a specific instance of an MTS application registered in a registry, orchestration service 128 may retrieve deployment code from the registry. For example, in response to operation 5.1, at operation 5.2, in response to the request, orchestration service 128 retrieves from app registry 126 registered MTS application 107 and stored copies of TSA deployment code 115A and TSB deployment code 115B. In some implementations, stored copies of TSA app code 114A and/or TSB app code 114B are also retrieved. In some implementations, a copy of deployment code 134 is also retrieved. In the implementations where the copies of TSA deployment code 115A and TSB deployment code 115B are stored in app registry 126 as part of their directory structure (as described herein), the copies are retrieved along with their directory structure. In some implementations, stored copies of 115A and 115B, 114A and/or 114B, and/or deployment code 134 are alternatively retrieved from artifacts repo 130 at operation 5.9.

Responsive to the retrieved deployment code, orchestration service 128 may perform one or more operations to install the specific instance of the registered MTS application. For example, in response to operation 5.2, responsive to the retrieved copies of TSA deployment code 115A and TSB deployment code 115B, orchestration service 128 executes process 129 to perform one or more operations to install a specific instance of registered MTS application 107.

Orchestration service 128 may perform operation(s) to determine whether dependency(s) exist between a first part of the deployment code and a second part of the deployment code for the registered MTS application and may detect that the first part of the deployment code is executable to receive information that will be generated responsive to execution of the second part of the deployment code. For example, process 129 performs operation(s) (not shown) to determine whether TSA deployment code 115A and TSB deployment code 115B have any interdependencies. In the example implementation described in FIG. 1A where TSA deployment code 115A and TSB deployment code 115B are implemented using an infrastructure as code platform (e.g., Terraform), the declared resources (also referred to as resource variables or resource blocks) in TSA deployment code 115A and TSB deployment code 115B are combined into one set of sources (e.g., using a resource graph, which is also referred to as a resource dependency graph or a dependency graph) and then analyzed for interdependencies, e.g., at compile time. In the example described in FIG. 1A where the value of the output TSB variable is being configurable to receive (e.g., being assigned) the value of input TSA variable, process 129 detects such a dependency.

Based on the detection described herein, orchestration service 128 may perform operation(s) to first execute the second part of the deployment code to deploy the specific instance of a second part of the registered MTS application and then execute the first part of the deployment code to deploy a specific instance of a first part of the registered MTS application. For example, responsive to detecting that the input TSA variable is configurable to receive the value of output TSB variable, orchestration service 128 performs operation(s) to first execute TSB deployment code 115B to deploy a specific instance of the TSB part of registered MTS application 107 and then execute TSA deployment code 115A to deploy a specific instance of the TSA part of registered MTS application 107. Orchestration service 128 may be implemented as a single computer program/application that is configurable to perform the deployment of a specific instance of each of the TSA and TSB parts of registered MTS application 107. Accordingly, at execution time, one instance of the program/application is executing in a single process on a given CPU and a single memory address space is allocated to the deployment of the two specific instances, thus enabling sharing of information between them.

During the execution of TSB deployment code 115B, at operation 5.3B, process 129, based on TSB deployment code 115B, invokes TSB orchestration adaptor API 148B to create resources (also referred to as resource objects) supported by TSB orchestration adaptor API 148B that correspond to the resources declared in TSB deployment code 115B. In response, at operation 5.4B, TSB orchestration adaptor API 148B converts the created resources to API calls to TSB resources API 146B. In the case that TSB app code 114B is stored with registered MTS application 107, the API calls to TSB resources API 146B include a copy of TSB app code 114B. In the alternative case where TSB app code 114B is stored in TSB code registry 150B, the API calls to TSB resources API 146B identify the registered TSB app code 114B. In response, at operation 5.6B, TSB resources API 146B executes the API calls, which deploy TSB app code 114B in execution environment 141B. In the case that the API calls identify registered TSB app code 114B, TSB app code 114B may be retrieved from TSB code registry 150B before the API calls are executed.

The information described herein may be generated responsive to execution of the second part of the deployment code and subsequently orchestration service 128 may receive the information. For example, in response to the completion of operation 5.6B (in the outbound direction), at operation 5.6B (in the inbound direction), TSB resources API 146B receives an output from the execution of the API calls, such as a location identifier of the deployed TSB app code 114B. In response, via operations 5.7B and 5.8B, TSB resources API 146B returns the output as the output of the execution of TSB deployment code 115B to process 129. In response, orchestration service 128 receives the output.

Responsive to receiving the information described herein, orchestration service 128 may configure the specific instance of the first part of the registered MTS application to communicate with the specific instance of the second part of the registered MTS application using the information. For example, in response to receiving the output of the execution of TSB deployment code 115B, process 129 uses the output to set the value of the output TSB variable that is configurable to hold information about how to communicate with the deployed TSB app code 114B. Further, process 129 sets the value of the input TSA variable with the value of the output TSB variable. In addition, process 129 performs one or more operations to make the value of the input TSA variable available to the TSA app code 114A in the following alternative implementations. In one implementation, TSA app code 114A is configurable to read the value of a variable in a configuration file ("in-file configuration variable"). In such an implementation, process 129 uses the value of the output TSB variable to set the value of the in-file configuration variable before performing operation 5.3A. In such a manner, the TSA app code 114A, when deployed in execution environment 141A, will be able to access the information about how to communicate with the deployed TSB app code 114B and a communication path 198 from the deployed TSA app code 114A to the deployed TSB app code 114B will be established. In another implementation, TSA app code 114A is configurable to read the value of a variable in the same memory address space as the output TSB variable in the execution environment 141A ("in-memory configuration variable"). In such an implementation, process 129 may use the value of the output TSB variable to set the value of the in-memory configuration variable when performing operation 5.3A. In such a manner, TSA app code 114A, when deployed in execution environment 141A, will be able to access the information about how to communicate with the deployed TSB app code 114B and a communication path 198 from the deployed TSA app code 114A to the deployed TSB app code 114B will be established.

Responsive to the specific instance of the first part of the registered MTS application being configured as described herein, orchestration service 128 may execute the first part of the deployment code to deploy a specific instance of the first part of the registered MTS application. For example, process 129 may execute TSA deployment code 115A to deploy TSA app code 114A and the execution may include performing operations 5.3A, 5.4A, 5.5A, and 5.6A (in the outbound direction similarly to performing operations 5.3B, 5.4B, 5.5B, and 5.6B (in the outbound direction) in the execution of TSB deployment code 115B, respectively. As a result, TSA app code 114A is deployed in execution environment 141A.

The orchestration service 128 and related services/APIs described herein provide several advantages over the prior art. These services allow for automatic, one-click deployment where different parts of a specific instance of an MTS application are deployed in one orchestrated deployment process as opposed to siloed deployment processes for the different parts. Further, these services enable establishing the ability for one part of an MTS application to interact with another part automatically during the deployment as opposed to manually after the deployment. For example, when the deployment is via an app store, as described herein, a specific instance of the application is deployed for a customer of the application developer without the need to perform manual steps after the deployment to establish the ability for the different parts of the application to interact. Even further, when each instance of an MTS application is deployed, a given part of the MTS application is deployed as an instance of that part in a specific execution environment and thus how to interact with the instance of that part is specific to that specific execution environment. Such specific execution environments may arise from the need for a variety of environments for testing the application for a variety of purposes during the development process. Such specific execution environments may also arise from the need to install an instance of the MTS application that is specific to each customer of the application developer (e.g., after the application is released to a marketplace). These services determine how to interact with such a specific instance of a given part of the MTS application dynamically during each deployment and thus allow for repeatable yet different deployment of specific instances of the MTS application.

Figure 2A:
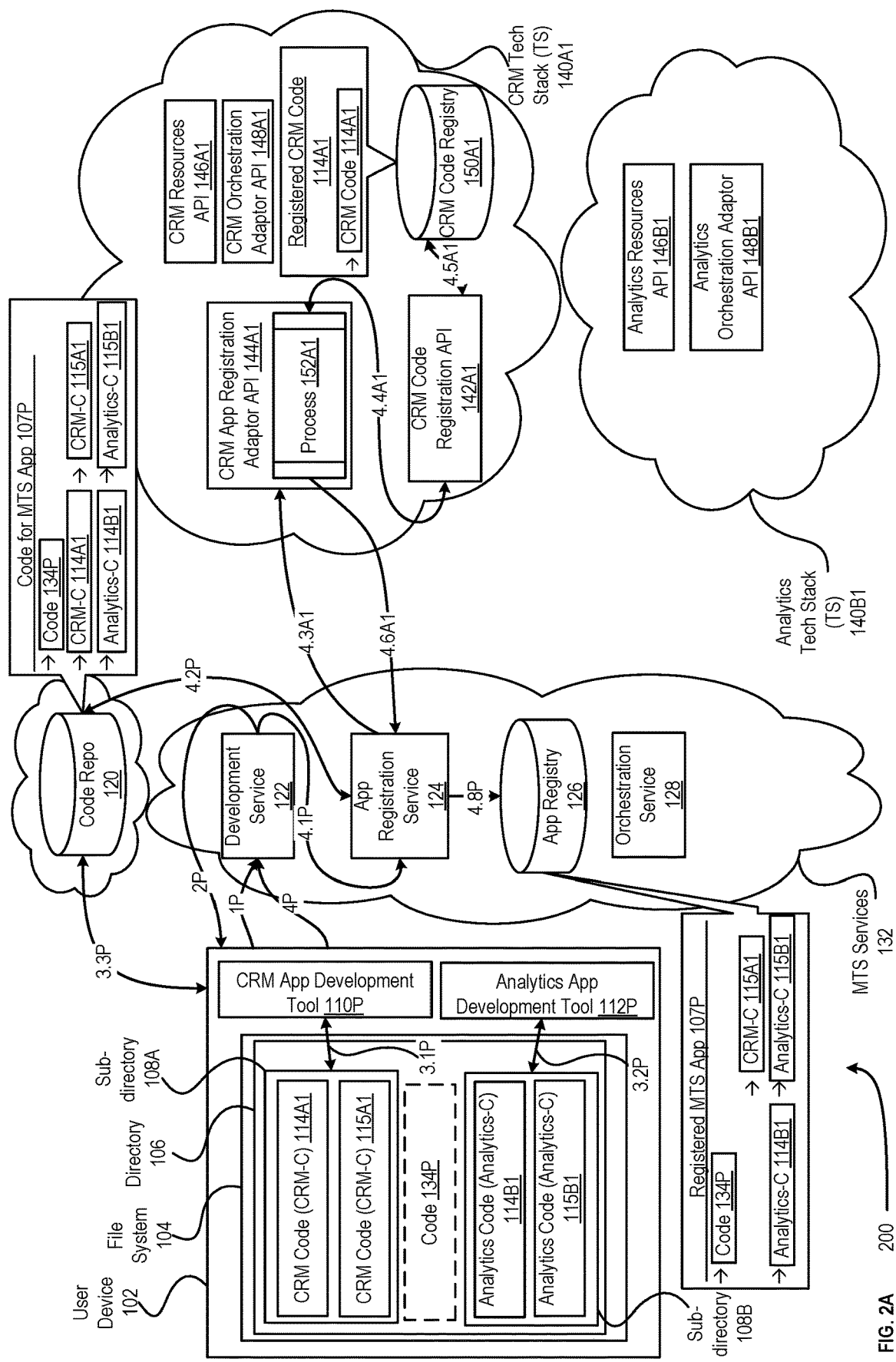
FIG. 2A is a diagram illustrating one aspect of the installation of an example MTS application according to some example implementations.

FIG. 2A is a diagram illustrating one aspect of the installation of an example MTS application according to some example implementations. The environment 200 illustrates a specific implementation of the environment 100 illustrated in FIGS. 1A and 1B.

In environment 200, MTS services 132 do not implement artifacts repo 130, as described in FIG. 1A.

Figure 2B:
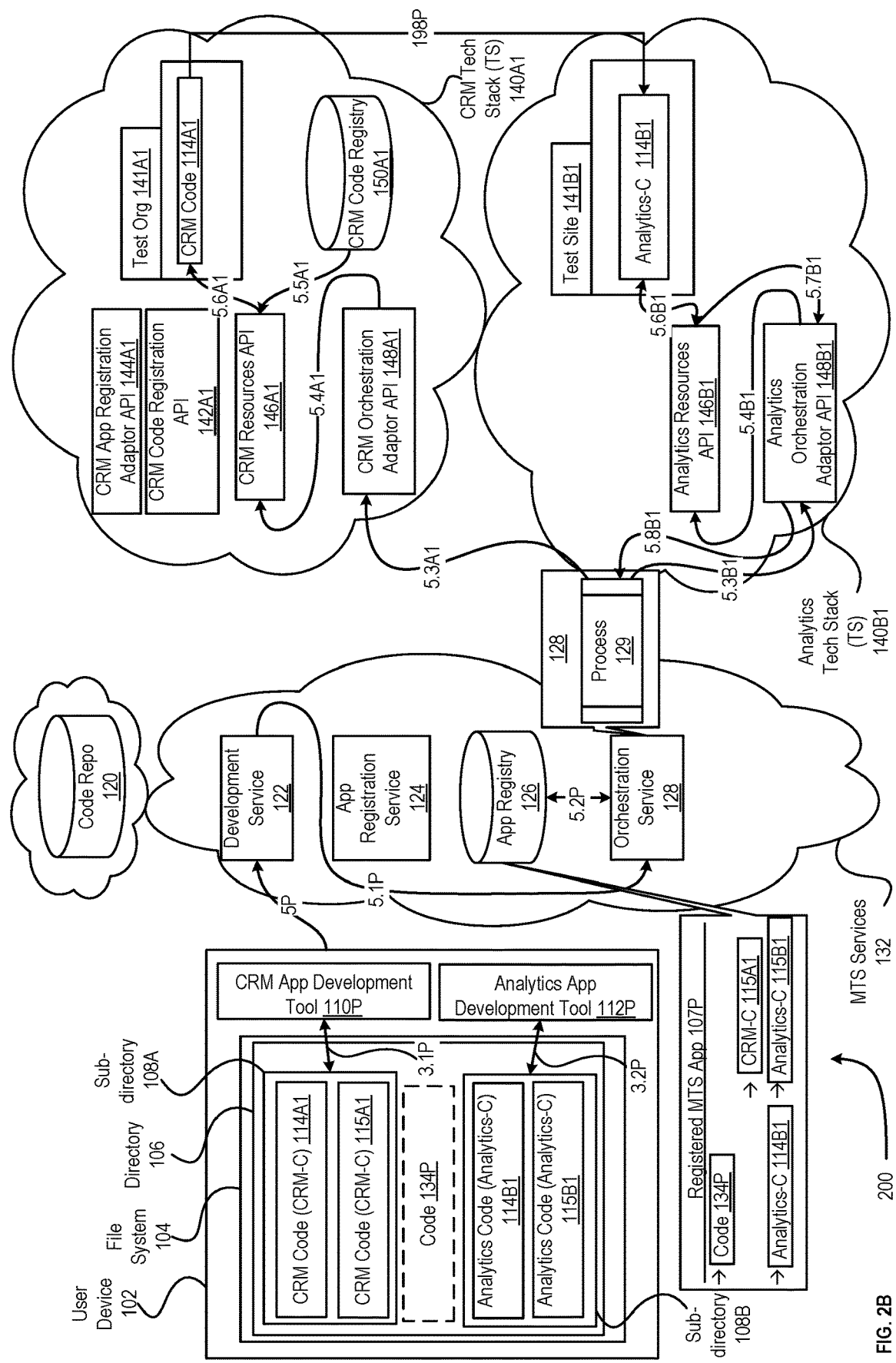
FIG. 2B is a diagram illustrating another aspect of the installation of an example MTS application according to some example implementations.

In environment 200, customer relationship management (CRM) tech stack 140A1 is a specific implementation of TSA 140A, as described in FIG. 1A. CRM tech stack 140A1 may be a cloud-based platform that provides customer relationship management-related services, such as the Salesforce CRM platform, the SAP CRM platform, etc. In this implementation, CRM app registration adaptor API 144A1, CRM code registration API 142A1, CRM code registry 150A1, CRM orchestration adaptor API 148A1, and CRM resources API 146A1 are specific implementations of TSA app registration adaptor API 144A, TSA code registration API 142A, TSA code registry 150A, TSA orchestration adaptor API 148A, and TSA resources API 146A, respectively. Further in this implementation, process 152A1 of CRM app registration adaptor API 144A1 is a specific implementation of process 152A of TSA app registration adaptor API 144A. Even further in this implementation, test org 141A1 (as shown in FIG. 2B) is a specific implementation of execution environment 141A. For example, in a multi-tenant architecture, test org 141A1 may be a test website (e.g., running in a web-based application environment) customized for the application developer's organization. The application developer may test an MTS application using such a website, including the CRM TS part of the application and how the CRM TS part interacts with the analytics TS part.

In environment 200, analytics tech stack 140B1 is a specific implementation of TSB 140B, as described in FIG. 1A. It may be a cloud-based platform that provides services related to analytics (e.g., visualization of analytics), such as the Tableau server or online platform, the SAP Analytics Cloud, etc. In this implementation, analytics orchestration adaptor API 148B1 and analytics resources API 146B1 are specific implementations of TSB orchestration adaptor API 148B and TSB resources API 146B, respectively. On the other hand, this implementation of TSB 140B does not provide a specific implementation of TSB app registration adaptor API 144B, TSB code registration API 142B, or TSB code registry 150B. Further in this implementation, test site 141B1 (as shown in FIG. 2B) is a specific implementation of execution environment 141B. For example, test site 141B1 may be a test website (e.g., running in a web-based application environment) configured for the application developer. The application developer may test an MTS application using such a website, including the analytics TS part of the application and how the analytics TS part interacts with the CRM TS part.

In environment 200, on user device 202, CRM app development tool 110P is a specific implementation of TSA app development tool 110 and analytics app development tool 112P is a specific implementation of TSB app development tool 112. 110P and 112P are used to develop respectively a first part and a second part of an MTS application 107P, where the first and second part will be executed on CRM tech stack 140A1 and analytics tech stack 140B1, respectively. Accordingly, MTS application 107P is a specific implementation MTS application 107.

An application developer may perform one or more operations to develop MTS application 107P using user device 202. For example, operations 1P, 2P, 3.1P, 3.2P, and 3.3P are performed similarly to operations 1, 2, 3.1, 3.2, and 3.3, respectively, as described in FIG. 1A.

As a result, the content of directory 106, as illustrated, is generated from the development process. Subdirectory 108A may include CRM code 114A1 (sometimes referred to as CRM app code 114A1) and CRM code 115A1 (sometimes referred to as CRM deployment code 115A1) similar to TSA app code 114A and TSA deployment code 115A, respectively, as described in FIG. 1A. Subdirectory 108B may include analytics code 114B1 (sometimes referred to as analytics app code 114B1) and analytics code 115B1 (sometimes referred to as analytics deployment code 115B1) similar to TSB app code 114B and TSB deployment code 115B, respectively, as described in FIG. 1A. In some implementations, directory 106 also includes code 134P (sometimes referred to as deployment code 134P) similar to deployment code 134, as described in FIG. 1A.

As a further result, copies of CRM app code 114A1, CRM deployment code 115A1, analytics app code 114B1, analytics deployment code 115B1, and, in some implementations, deployment code 134P (sometimes collectively referred to as code for MTS Application 107P) are stored in code repo 120.

One or more operations may be performed to register MTS application 107P for subsequent installations of the application. For example, operations 4P and 4.1P are performed similarly to operations 4 and 4.1, respectively, as described in FIG. 1A. As a result, app registration service 124 receives from development service 122 a request for registering MTS application 107P for subsequent installations of the application.

In response, operation 4.2P is performed similarly to operation 4.2 as described in FIG. 1A. As a result, app registration service 124 retrieves code for MTS application 107P from code repo 120.

In response, prior to registering the MTS application 107P, app registration service 124 determines whether the respective tech stack of each part of the MTS application 107P supports bundling, as described in FIG. 1A. In environment 200, because analytics tech stack 140B1 does not implement a specific implementation of TSB app registration adaptor API 144B, TSB code registration API 142B, or TSB code registry 150B, analytics tech stack 140B1 does not support bundling or packaging. On the other hand, CRM tech stack 140A1 supports bundling and packaging.

Responsive to determining that CRM tech stack 140A1 supports bundling, operations 4.3A1, 4.4A1, 4.5A1, and 4.6A1 are performed similarly to operations 4.3A, 4.4A, 4.5A, and 4.6A, respectively, as described in FIG. 1A. As a result, CRM app code 114A1 is registered as registered CRM code 114A1 (sometimes referred to as registered CRM app code 114A1). As a further result, process 152A1 performs one or more operations to update the copy of CRM deployment code 115A1 and sends the updated copy to app registration service 124 for registering the MTS application 107P.

In response to operation 4.6A1, app registration service 124 performs one or more operations, similar to the response to operation 4.6A, as described in FIG. 1A. As a result, when registering MTS application 107P in app registry 126 at operation 4.8P, the updated copy of CRM deployment code 115A1 (instead of the original copy of CRM deployment code 115A1 from code repo 120) is stored and the copy of CRM app code 114A1 is not stored.

Responsive to determining that analytics tech stack 140B1 does not support bundling, operations similar to operations 4.3B, 4.4B, 4.5B, and 4.6B, as described in FIG. 1A, are not performed. As a result, when registering MTS application 107P in app registry 126 at operation 4.8P, the original copies of analytics app code 114B1 and analytics deployment code 115B1 from code repo 120 are stored.

FIG. 2B is a diagram illustrating another aspect of the installation of an example MTS application according to some example implementations.

Further to the description in FIG. 2A, in environment 200, one or more operations may be performed to install a specific instance of registered MTS application 107P. For example, operations 5P and 5.1P are performed similarly to operations 5 and 5.1, respectively, as described in FIG. 1B. As a result, orchestration service 128 receives from development service 122 a request for installing a specific instance of registered MTS application 107P.

In response, operation 5.2P is performed similarly to operation 5.2 as described in FIG. 1B. As a result, orchestration service 128 retrieves registered MTS application 107P and associated code (as shown) from app registry 126. The associated code includes copies of CRM deployment code 115A1, analytics app code 114B1, analytics deployment code 115B1, and deployment code 134P.

In response, orchestration service 128 may perform one or more operations to install the specific instance of the registered MTS application 107P, similar to the operation(s) performed to install a specific instance of registered MTS application 107, as described in FIG. 1B. For example, process 129 performs one or more operations to determine whether dependency(s) exist between CRM deployment code 115A1 and analytics deployment code 115B1. Similarly, the value of a variable ("input CRM variable") declared in CRM deployment code 115A1 is configurable to receive (e.g., being assigned) the value of a variable ("output analytics variable") declared in analytics deployment code 115B1 and accordingly process 129 detects such a dependency.

In response, similar to operation(s) performed in FIG. 1B, orchestration service 128 performs operation(s) to first execute analytics deployment code 115B1 to deploy a specific instance of the analytics TS part of registered MTS application 107P and then execute CRM deployment code 115A1 to deploy a specific instance of the CRM TS part of registered MTS application 107P. For example, operations 5.3B1, 5.4B1, 5.6B1, 5.7B1, and 5.8B1 are performed similarly to operations 5.3B, 5.4B, 5.6B, 5.7B, and 5.8B, respectively. As a result, at operation 5.6B, analytics app code 114B1 is deployed on test site 141B1. Further, the deployment of analytics app code 114B1 produces an output, such as a location identifier of the deployed analytics app code 114B1, and the output is returned as the output of the execution of analytics deployment code 115B1, which is used to set the value of output analytics variable. In response, the value of the output analytics variable is used to set the value of the input CRM variable. In response, process 129 performs similar operation(s) to make the value of the input CRM variable available to the CRM app code 114A1 in similar implementations. In response, process 129 executes CRM deployment code 115A1 to deploy CRM app code 114A1 and the execution may include performing operations 5.3A1, 5.4A1, 5.5A1, and 5.6A1 (in the outbound direction) similarly to performing operations 5.3A, 5.4A, 5.5A, and 5.6A (in the outbound direction), respectively, as described in FIG. 1B. As a result, CRM app code 114A1 is deployed in test org 141A1 and a communication path 198P from the deployed CRM app code 114A1 (e.g., a CRM webpage within test org 141A1) to the deployed analytics app code 114B1 (e.g., a web-based analytics visualization component, such as a Tableau workbook) is established.

Figure 2C:
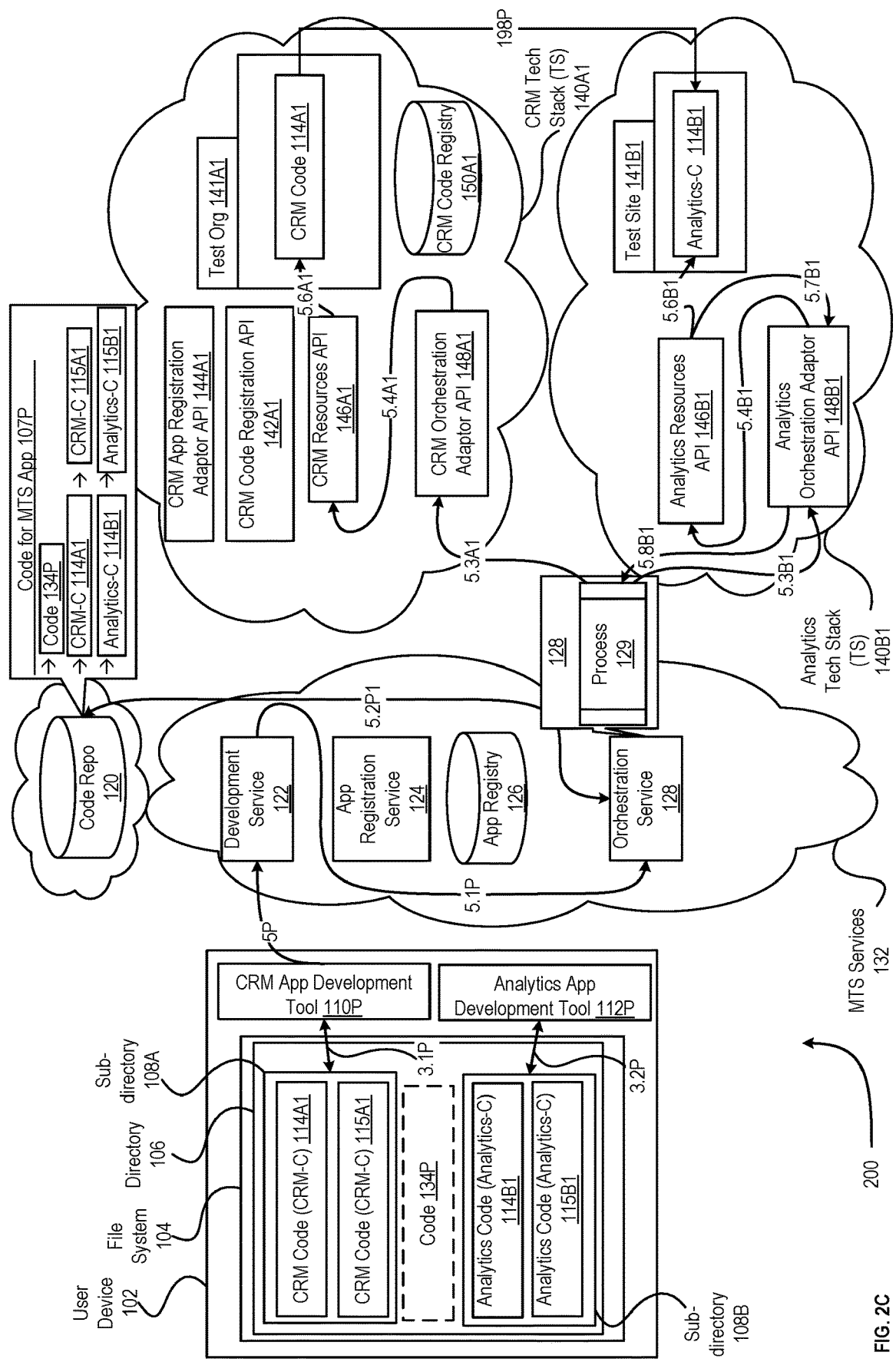
FIG. 2C is a diagram illustrating another aspect of the installation of an example MTS application according to some example implementations.

FIG. 2C is a diagram illustrating another aspect of the installation of an example MTS application according to some example implementations.

Further to the description in FIGS. 2A and 2B, in environment 200, one or more operations may be performed to install an instance of MTS application 107P directly using code for MTS app 107 that is stored in code repo 120. Such a case may arise from the need of an application server to test an MTS application on tech stacks before registering the MTS application in app registry 126 for repeatable deployment of different instances of the MTS application. Such test may inform the application developer to make modification(s) to the app code and/or development code associated with the MTS application before registering the MTS application.

Accordingly, the same operations shown in FIG. 2B are performed here in FIG. 2C with two modifications. Instead of performing operation 5.2P of retrieving the code associated with registered MTS application 107P from app registry 126, operation 5.2P1 is performed to retrieve code for MTS application 107P from code repo 120 here. Also, operation 5.5A1 is not performed here.

Figure 3A:
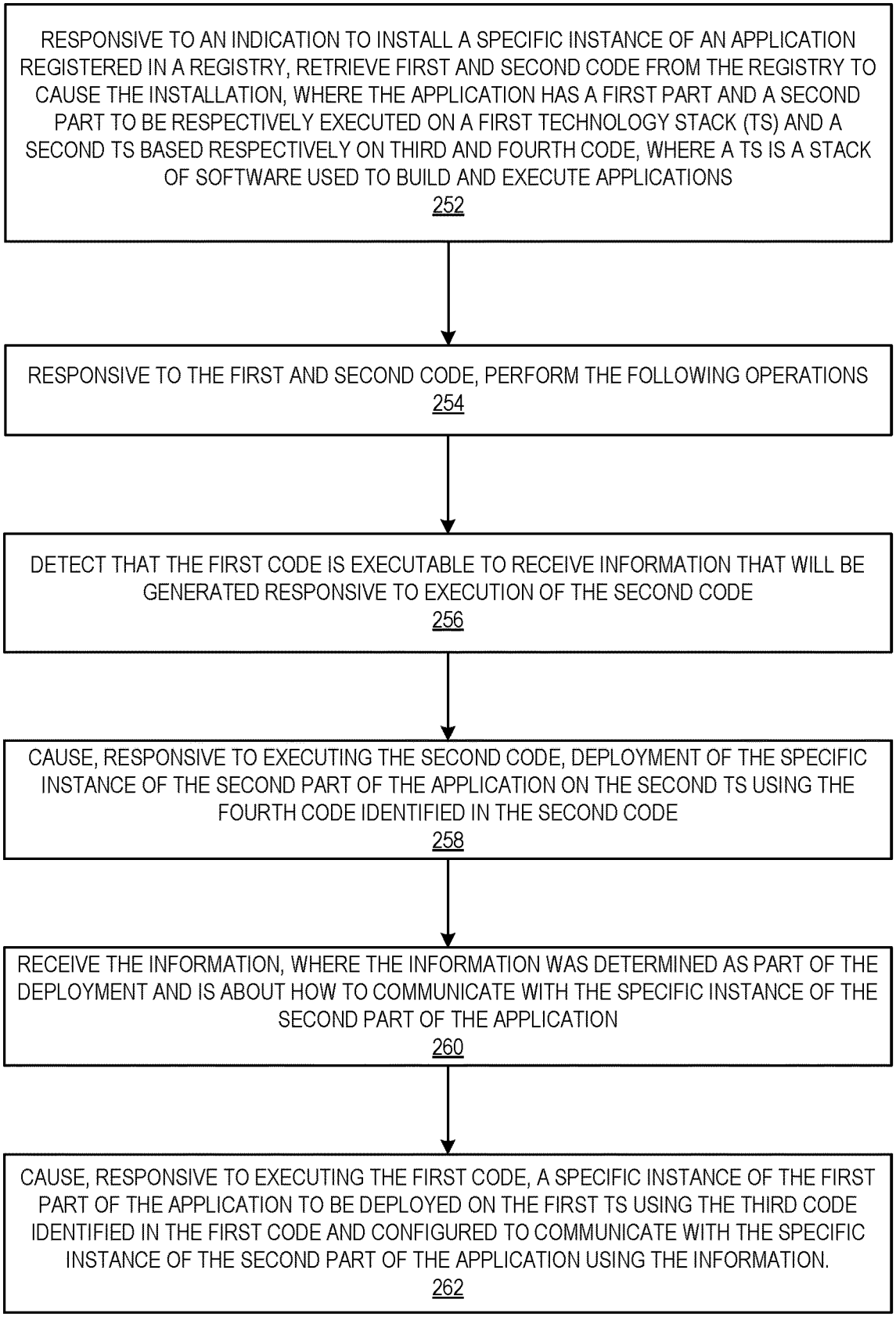
FIG. 3A is a flow diagram illustrating one aspect of the installation of an example MTS application according to some example implementations.

FIG. 3A is a flow diagram illustrating one aspect of the installation of an example MTS application according to some example implementations. The exemplary operations illustrated in FIG. 3A are the operations for installing a specific instance of a previously registered MTS application. The operations of FIG. 3A may be performed as described in further details with respect to FIGS. 1A-B and 2A-C. At operation 252, responsive to an indication to install a specific instance of an application registered in a registry, first and second code are retrieved from the registry to cause the installation. For example, the first and second code may respectively be the TSA deployment code 115A and TSB deployment code 115B. The application may have a first part and a second part to be respectively executed on a first technology stack (TS) and a second TS based respectively on third and fourth code. For example, the third and fourth code may respectively be the TSA app code 114A and TSB app code 114B.

In some implementations, the first and second code identify whether the respective one of the third and fourth code is stored locally or within the respective one of the first and second TS. In some implementations, a file directory with a first and second subdirectories is in the registry, the first and second code are in the respective one of the first and second subdirectories, and fifth code (e.g., the deployment code 134) is in the file directory and identifies the first and second subdirectories. In some implementations, the first and second code identify whether the respective one of the third and fourth code is within the respective one of the first and second subdirectories or in the respective one of the first and second TS. In some implementations, the application has a third part to be executed on a third TS based on sixth code. In some implementations, the stack of software used to build and execute applications is a cloud-based software development and deployment environment.

The flow of operations moves to operation 254, at which one or more operations (e.g., operations 256, 258, 260, and/or 262) are performed responsive to the first and second code. The flow of operations moves to operation 256, at which it is detected that the first code is executable to receive information that will be generated responsive to execution of the second code. The flow of operations moves to operation 258, at which, responsive to executing the second code, the specific instance of the second part of the application is caused to be deployed on the second TS using the fourth code identified in the second code.

The flow of operations moves to operation 260, at which the information is received. For example, the information was determined as part of the deployment and is about how to communicate with the specific instance of the second part of the application. In some implementations, the information about how to communicate with the specific instance of the second part of the application includes a location identifier of the specific instance of the second part of the application.

The flow of operations moves to operation 262, at which, responsive to executing the first code, a specific instance of the first part of the application is caused to be deployed on the first TS using the third code identified in the first code and caused to be configured to communicate with the specific instance of the second part of the application using the information. In some implementations, the specific instance of the first part of the application is being configured to communicate with the specific instance of the second part of the application while being deployed on the first TS.

FIG. 3B is a flow diagram illustrating one aspect of the registration of an example MTS application according to some example implementations. The exemplary operations illustrated in FIG. 3B are the operations for registering an MTS application for subsequent installations of the application. The operations of FIG. 3B may be performed as described in further details with respect to FIGS. 1A-B and 2A-C. At operation 272, responsive to receiving an indication to register an application for subsequent installations of the application, first and second code is retrieved from a repository. For example, the first and second code may respectively be the TSA deployment code 115A and TSB deployment code 115B. The application may have a first part and a second part to be respectively executed on a first technology stack (TS) and a second TS based respectively on third and fourth code. For example, the third and fourth code may respectively be the TSA app code 114A and TSB app code 114B. For example, when executed by a service, the first and second code may cause the service to perform one or more operations (e.g., operations 274, 276, 278, 280, and/or 282). In some implementations, the first and second code identify that the respective one of the third and fourth code is stored locally. In some implementations, the first and second code identify that the respective one of the third and fourth code is within the respective one of the first and second subdirectories. In some implementations, a file directory with a first and second subdirectories is in the repository, the first and second code are in the respective one of the first and second subdirectories, and fifth code (e.g., the deployment code 134) is in the file directory and identifies the first and second subdirectories.

In some implementations, the application has a third part to be executed on a third TS based on sixth code. In some implementations, the stack of software used to build and execute applications is a cloud-based software development and deployment environment.

The flow of operations moves to operation 274, which is an operation similar to the operation 256 in FIG. 3A. The flow of operations moves to operation 276, which is an operation similar to the operation 258 in FIG. 3A. The flow of operations moves to operation 278, which is an operation similar to the operation 260 in FIG. 3A. The flow of operations moves to operation 280, which is an operation similar to the operation 262 in FIG. 3A.

The flow of operations moves to operation 282, at which the application is registered as retrievable for the subsequent installations of the application. In some implementations, the registering of the application includes registering the respective one of the first and second code.

In some implementations, responsive to receiving the indication to register the application for subsequent installations of the application, another operation is also performed where the operation is an operation of determining whether a given TS of the first and second TS supports registration, storage, and deployment of code. In such implementations, responsive to determining that the given TS supports registration, storage, and deployment of code, the following operations are also performed: causing the respective one of the third and fourth code to be registered by the given TS; receiving, from the given TS, a modified version of the respective one of the first and second code; replacing the respective one of the first and second code with the modified version of the respective one of the first and second code. Further, responsive to determining that the given TS does not support registration, storage, and deployment of code, another operation is also performed where the operation is an operation of registering of the respective one of the third and fourth code as part of the registering of the application.

In some implementations, responsive to receiving the indication to register the application for subsequent installations of the application, the following operations are also performed: causing, for a given TS of the first and second TS, the respective one of the third and fourth code to be registered by the given TS; receiving, from the given TS, a modified version of the respective one of the first and second code; and replacing the respective one of the first and second code with the modified version of the respective one of the first and second code. In such implementations, prior to the causing the respective one of the third and fourth code to be registered by the given TS, another operation is also performed where the operation is an operation of determining the given TS supports registration, storage, and deployment of code.

In some implementations, responsive to receiving the indication to register the application for subsequent installations of the application, another operation is also performed where the operation is an operation of registering the respective one of the third and fourth code as part of the registering of the application. In such implementations, the operation of registering of the respective one of the third and fourth code as part of the registering of the application is performed in response to determining a given TS of the first and second TS does not support registration, storage, and deployment of code.

Example Electronic Devices and Environments
Electronic Device and Machine-Readable Media One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer/application developer, and end user roles. As an administrator, a user typically uses electronic devices to administer them for other users, and thus an administrator often works directly and/or indirectly with server devices and client devices.

Figure 4A:
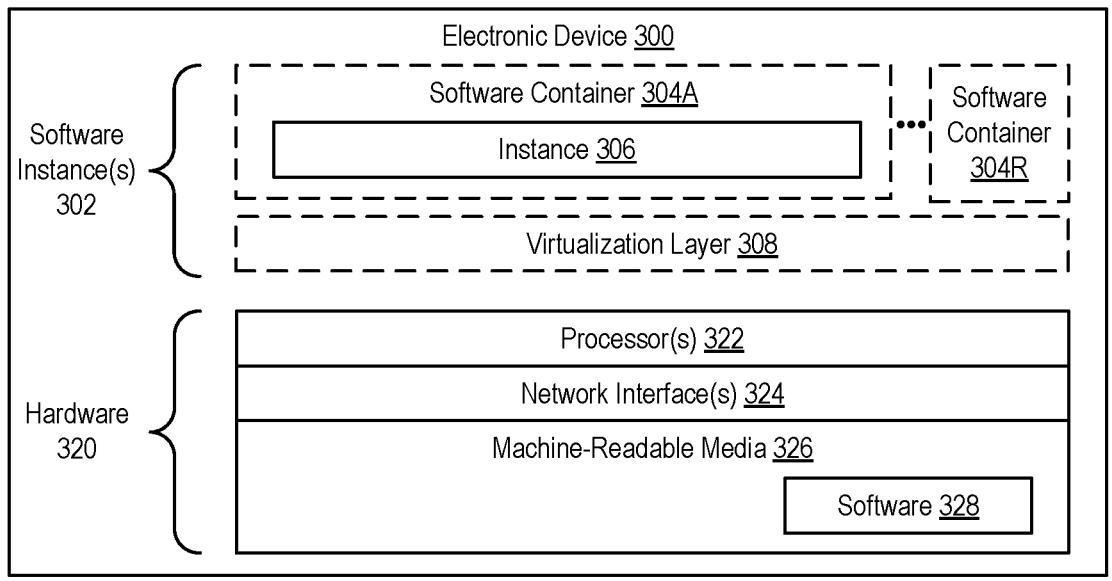
FIG. 4A is a block diagram illustrating an electronic device according to some example implementations.

FIG. 4A is a block diagram illustrating an electronic device 330 according to some example implementations. FIG. 4A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients, the orchestration service 128, and app registration service 124 may be implemented in one or more electronic devices 300. In one implementation: 1) each of the clients is implemented in a separate one of the electronic devices 300 (e.g., in end user devices where the software 328 represents the software to implement clients to interface directly and/or indirectly with the orchestration service 128 and/or app registration service 124 (e.g., software 328 represents a web browser, a native client, a portal, a command-line interface, and/or an application programming interface (API) based upon protocols such as Simple Object Access Protocol (SOAP), Representational State Transfer (REST), etc.)); 2) the orchestration service 128 and/or app registration service 124 are implemented in a separate set of one or more of the electronic devices 300 (e.g., a set of one or more server devices where the software 328 represents the software to implement the orchestration service 128 and/or app registration service 124); and 3) in operation, the electronic devices implementing the clients, and the orchestration service 128 and/or app registration service 124 would be communicatively coupled (e.g., by a network) and would establish between them (or through one or more other layers and/or or other services) connections for submitting an indication to install a specific instance of an MTS application registered in a registry or an indication to register an MTS application for subsequent installations of the application to the orchestration service 128 or app registration service 124, respectively, and confirming to the clients that a specific instance of the MTS application registered in the registry is installed or the MTS application is registered for subsequent installations of the application, respectively. Other configurations of electronic devices may be used in other implementations (e.g., an implementation in which the client, and the orchestration service 128 and/or app registration service 124 are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (such as Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

Alternative implementations of an electronic device may have numerous variations from that described above. For example, customized hardware and/or accelerators might also be used in an electronic device.

Example Environment

Figure 4B:
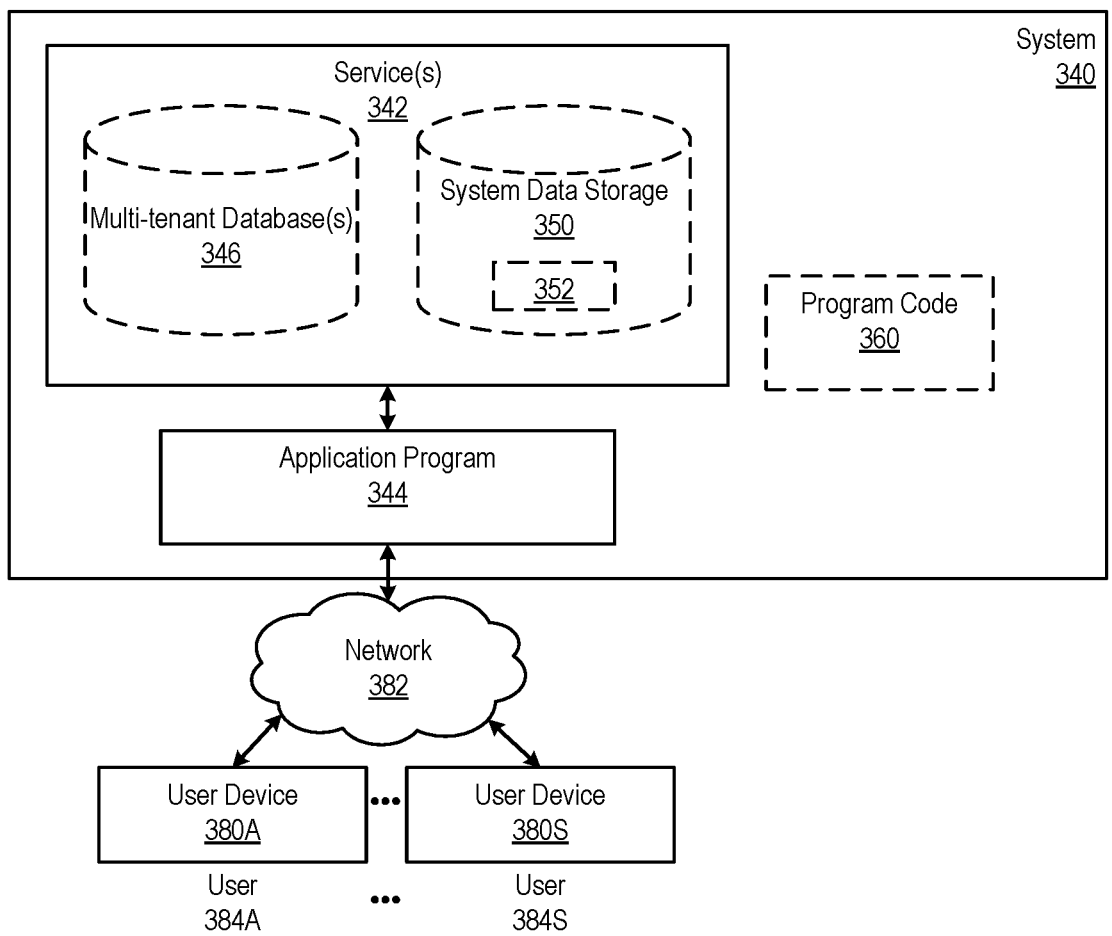
FIG. 4B is a block diagram of a deployment environment according to some example implementations.

FIG. 4B is a block diagram of a deployment environment according to some example implementations. A system 340 includes hardware (e.g., a set of one or more server devices) and software to provide service(s) 342, including the orchestration service 128 and/or app registration service 124. In some implementations the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 340 is coupled to user devices 380A-380S over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS), such as orchestration service 128 and app registration service 124; Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Security; and Identity and access management (IAM).

For example, system 340 may include an application platform 344 that enables PAAS for creating, managing, and executing one or more applications developed by the provider of the application platform 344, users accessing the system 340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices 380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the orchestration service 128 and app registration service 124, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 340. For example, the user interface device can be used to access data and applications hosted by system 340, and to perform searches on stored data, and otherwise allow one or more of users 384A-384S to interact with various GUI pages that may be presented to the one or more of users 384A-384S. User devices 380A-380S might communicate with system 340 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system 340, thus allowing users 384A-384S of the user devices 380A-380S to access, process and view information, pages and applications available to it from system 340 over network 382.

CONCLUSION

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting.

What is claimed is:

1. A non-transitory machine-readable storage medium that provides instructions that, if executed by a processor, are configurable to cause said processor to perform operations comprising:
responsive to an indication to install a specific instance of an application registered in a registry, retrieving first and second code from the registry to cause the installation, wherein the application has a first part and a second part to be respectively executed on a first technology stack (TS) and a second TS based respectively on third and fourth code, wherein a TS is a stack of software used to build and execute applications; and
responsive to the first and second code, performing the following:
detecting that the first code is executable to receive information that will be generated responsive to execution of the second code;
causing, responsive to executing the second code, deployment of the specific instance of the second part of the application on the second TS using the fourth code identified in the second code; and
receiving the information, wherein the information was determined as part of the deployment and is about how to communicate with the specific instance of the second part of the application; and
causing, responsive to executing the first code, a specific instance of the first part of the application to be deployed on the first TS using the third code identified in the first code and configured to communicate with the specific instance of the second part of the application using the information.

2. The non-transitory machine-readable storage medium of claim 1, wherein the first and second code identify whether the respective one of the third and fourth code is stored locally or within the respective one of the first and second TS.

3. The non-transitory machine-readable storage medium of claim 1, wherein a file directory with a first and second subdirectories is in the registry, and wherein the first and second code are in the respective one of the first and second subdirectories, and fifth code is in the file directory and identifies the first and second subdirectories.

4. The non-transitory machine-readable storage medium of claim 3, wherein the first and second code identify whether the respective one of the third and fourth code is within the respective one of the first and second subdirectories or in the respective one of the first and second TS.

5. The non-transitory machine-readable storage medium of claim 1, wherein the information about how to communicate with the specific instance of the second part of the application includes a location identifier of the specific instance of the second part of the application.

6. The non-transitory machine-readable storage medium of claim 1, wherein the specific instance of the first part of the application is being configured to communicate with the specific instance of the second part of the application while being deployed on the first TS.

7. The non-transitory machine-readable storage medium of claim 1, wherein the application has a third part to be executed on a third TS based on sixth code.

8. The non-transitory machine-readable storage medium of claim 1, wherein the stack of software used to build and execute applications is a cloud-based software development and deployment environment.

9. A non-transitory machine-readable storage medium that provides instructions that, if executed by a processor, are configurable to cause said processor to perform operations comprising:
responsive to receiving an indication to register an application for subsequent installations of the application, retrieving first and second code from a repository, wherein the application has a first part and a second part to be respectively executed on a first technology stack (TS) and a second TS based respectively on third and fourth code, wherein a TS is a stack of software used to build and execute applications, and wherein the first and second code, when executed by a service, causes the service to perform the following:
detecting that the first code is executable to receive information that will be generated responsive to execution of the second code;
causing, responsive to executing the second code, deployment of a specific instance of the second part of the application on the second TS using the fourth code identified in the second code; and
receiving the information, wherein the information was determined as part of the deployment and is about how to communicate with a specific instance of the second part of the application; and
causing, responsive to executing the first code, a specific instance of the first part of the application to be deployed on the first TS using the third code identified in the first code and configured to communicate with the specific instance of the second part of the application using the information; and
registering the application as retrievable for the subsequent installations of the application.

10. The non-transitory machine-readable storage medium of claim 9, wherein the first and second code identify that the respective one of the third and fourth code is stored locally.

11. The non-transitory machine-readable storage medium of claim 9, wherein, responsive to receiving the indication to register the application for subsequent installations of the application, also performing the operations of:
determining whether a given TS of the first and second TS supports registration, storage, and deployment of code.

12. The non-transitory machine-readable storage medium of claim 11, wherein, responsive to determining that the given TS supports registration, storage, and deployment of code, also performing the operations of:
causing the respective one of the third and fourth code to be registered by the given TS;
receiving, from the given TS, a modified version of the respective one of the first and second code; and
replacing the respective one of the first and second code with the modified version of the respective one of the first and second code.

13. The non-transitory machine-readable storage medium of claim 12, wherein, responsive to determining that the given TS does not support registration, storage, and deployment of code, also performing the operations of:
    registering of the respective one of the third and fourth code as part of the registering of the application.

14. The non-transitory machine-readable storage medium of claim 9, wherein a file directory with a first and second subdirectories is in the repository, and wherein the first and second code are in the respective one of the first and second subdirectories, and fifth code is in the file directory and identifies the first and second subdirectories.

15. The non-transitory machine-readable storage medium of claim 14, wherein the first and second code identify that the respective one of the third and fourth code is within the respective one of the first and second subdirectories.

16. The non-transitory machine-readable storage medium of claim 9, wherein, responsive to receiving the indication to register the application for subsequent installations of the application, also performing the operations of:
    causing, for a given TS of the first and second TS, the respective one of the third and fourth code to be registered by the given TS;
    receiving, from the given TS, a modified version of the respective one of the first and second code; and
    replacing the respective one of the first and second code with the modified version of the respective one of the first and second code.

17. The non-transitory machine-readable storage medium of claim 16, wherein the operations also comprise:
    determining, prior to the causing the respective one of the third and fourth code to be registered by the given TS, that the given TS supports registration, storage, and deployment of code.

18. The non-transitory machine-readable storage medium of claim 9, wherein, responsive to receiving the indication to register the application for subsequent installations of the application, also performing the operations of:
    registering the respective one of the third and fourth code as part of the registering of the application.

19. The non-transitory machine-readable storage medium of claim 18, wherein, the registering of the respective one of the third and fourth code as part of the registering of the application is responsive to determining a given TS of the first and second TS does not support registration, storage, and deployment of code.

20. The non-transitory machine-readable storage medium of claim 9, wherein the registering of the application comprises registering the respective one of the first and second code.

21. The non-transitory machine-readable storage medium of claim 9, wherein the information about how to communicate with the specific instance of the second part of the application includes a location identifier of the specific instance of the second part of the application.

22. The non-transitory machine-readable storage medium of claim 9, wherein the specific instance of the first part of the application is being configured to communicate with the specific instance of the second part of the application while being deployed on the first TS.

23. The non-transitory machine-readable storage medium of claim 9, wherein the application has a third part to be executed on a third TS based on sixth code.

24. The non-transitory machine-readable storage medium of claim 9, wherein the stack of software used to build and execute applications is a cloud-based software development and deployment environment.

\* \* \* \* \*